United States Patent
Dobbs et al.

(10) Patent No.: US 9,558,150 B2
(45) Date of Patent: *Jan. 31, 2017

(54) PROCESSING SYSTEM WITH SYNCHRONIZATION INSTRUCTION

(71) Applicant: COHERENT LOGIX, INCORPORATED, Austin, TX (US)

(72) Inventors: Carl S. Dobbs, Austin, TX (US); Afzal M. Malik, Austin, TX (US); Kenneth R. Faulkner, Austin, TX (US); Michael B. Solka, Austin, TX (US)

(73) Assignee: Coherent Logix, Incorporated, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/073,276

(22) Filed: Mar. 17, 2016

(65) Prior Publication Data

US 2016/0196234 A1 Jul. 7, 2016

Related U.S. Application Data

(63) Continuation of application No. 14/051,140, filed on Oct. 10, 2013, now Pat. No. 9,323,714.

(60) Provisional application No. 61/734,190, filed on Dec. 6, 2012.

(51) Int. Cl.
*G06F 1/24* (2006.01)
*G06F 15/76* (2006.01)
*G06F 9/52* (2006.01)

(52) U.S. Cl.
CPC ............... *G06F 15/76* (2013.01); *G06F 9/522* (2013.01)

(58) Field of Classification Search
CPC ..................... G06F 12/0813; G06F 8/458
See application file for complete search history.

(56) References Cited

U.S. PATENT DOCUMENTS

| 5,222,229 | A | 6/1993 | Fukuda |
| 5,345,578 | A | 9/1994 | Manasse |
| 5,434,995 | A | 7/1995 | Oberlin |
| 5,721,921 | A | 2/1998 | Kessler |
| 7,398,403 | B2 | 7/2008 | Nishioka |
| 7,415,594 | B2 | 8/2008 | Doerr |
| 8,880,866 | B2 | 11/2014 | Doerr |
| 8,963,599 | B2 | 2/2015 | Dobbs |
| 2002/0052926 | A1* | 5/2002 | Bush ................ G06F 8/458 709/217 |
| 2004/0034858 | A1* | 2/2004 | Kushlis ............ G06F 9/30043 718/108 |

(Continued)

*Primary Examiner* — Hyun Nam
(74) *Attorney, Agent, or Firm* — Meyertons Hood Kivlin Kowert & Goetzel, P.C.; Jeffrey C. Hood

(57) ABSTRACT

Embodiments of a multi-processor array are disclosed that may include a plurality of processors, and controllers. Each processor may include a plurality of processor ports and a sync adapter. Each sync adapter may include a plurality of adapter ports. Each controller may include a plurality of controller ports, and a configuration port. The plurality of processors and the plurality of controllers may be coupled together in an interspersed arrangement, and the controllers may be distinct from the processors. Each processor may be configured to send a synchronization signal through its adapter ports to one or more controllers, and to pause execution of program instructions while waiting for a response from the one or more controllers.

20 Claims, 19 Drawing Sheets

(56) References Cited

U.S. PATENT DOCUMENTS

2005/0131865 A1\* 6/2005 Jones ................... G06F 9/4881
2008/0022142 A1 1/2008 Nishioka
2009/0327354 A1 12/2009 Resnick
2014/0143520 A1 5/2014 Dobbs \* cited by examiner

PROCESSING SYSTEM WITH SYNCHRONIZATION INSTRUCTION

PRIORITY CLAIM

This application is a continuation of U.S. patent application Ser. No. 14/051,140, filed on Oct. 10, 2013, which claims the benefit of U.S. Provisional Patent Application 61/734,190 filed on Dec. 6, 2012, whose disclosures are incorporated herein by reference.

BACKGROUND

Technical Field

The present disclosure relates to computer systems and digital signal processors (DSP), and more particularly, to multi-processor systems.

Description of the Related Art

The present application relates to electronic systems, especially digital electronic systems such as computers, digital signal processors (DSP), and these systems embedded in larger systems. More particularly the concept relates to signal networks within digital electronic systems, and especially to synchronization signal networks within multi-processor arrays (MPAs). An MPA is composed of a group of processing elements (PE), supporting memories (SM), and a primary interconnection network (PIN) that supports high bandwidth data communication among the PEs and memories.

A PE has registers to buffer input data and output data, an instruction processing unit (IPU), and logic/circuitry for performing arithmetic and logic functions on the data plus a number of switches and ports to communicate with other parts of the system. The IPU fetches instructions from memory, decodes them, and sets appropriate control signals to move data in and out of the processor and to perform arithmetic and logical functions.

Memory for computers and DSP is organized in a hierarchy with fast memory at the top and slower but higher capacity memory at each step down the hierarchy. In an MPA, supporting memories at the top of the hierarchy are located adjacent to each PE. Each supporting memory may be specialized to hold only instructions or only data. Supporting memory for a particular PE may be private to that PE or shared with other PE.

MPAs were first constructed as arrays of digital integrated circuits (ICs) on circuit boards, each IC containing one processor, and the circuit board providing the data communication links to interconnect the processors. The continuing progress in very large scale integration (VLSI) technology based on complementary metal oxide silicon (CMOS) transistor circuits with finer fabrication dimensions has resulted in great increases in the densities of logic and memory circuits per silicon IC chip. Today, on a single IC chip, MPAs are made with a hundred or more processors and their supporting memories and interconnection networks. These MPA chips may be further interconnected on circuit boards to make larger systems.

PEs suitable for MPA may be more energy efficient than general purpose processors (GPP), simply because of the large number of PEs per MPA chip, and the extra energy becomes extra waste heat and its removal adds to chip packaging and operational costs.

SUMMARY OF THE EMBODIMENTS

Various embodiments of a multi-processor array are disclosed. Broadly speaking, a circuit and a method are contemplated in which a plurality of processors and a plurality controllers are coupled together in an interspersed fashion. Each processor includes a plurality of processor ports and a sync adapter, which includes a plurality of adapter ports. Each adapter port is coupled to a controller port of one of a plurality of controllers, each controller including a plurality of controller ports, and a configuration port. Each processor is configured to send a synchronization signal through one or more adapter ports to a respective one or more controllers, and is further configured to pause execution of program instructions dependent on receiving a response from the one or more controllers.

In a further embodiment, each controller may include a configuration port. The configuration port may be configured to receive one or more configuration data bits.

In another non-limiting embodiment, each controller may be further configured to send the response dependent upon the one or more configuration bits.

Figure 1:
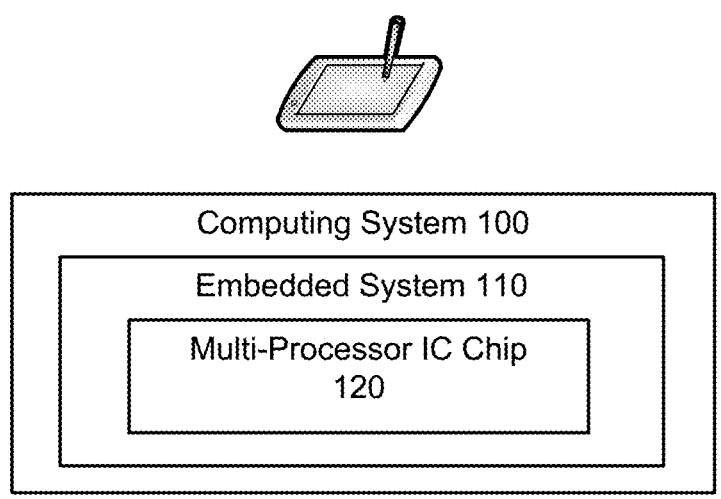
FIG. 1 is a block diagram illustrating an embodiment of computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

Incorporation by Reference

U.S. Pat. No. 7,415,594 titled "Processing System With Interspersed Stall Propagating Processors And Communication Elements" whose inventors are Michael B. Doerr, William H. Hallidy, David A. Gibson, and Craig M. Chase is hereby incorporated by reference in its entirety as though fully and completely set forth herein.

U.S. patent application Ser. No. 13/274,138, titled "Disabling Communication in a Multiprocessor System", filed Oct. 14, 2011, whose inventors are Michael B. Doerr, Carl S. Dobbs, Michael B. Solka, Michael R Trocino, and David A. Gibson is hereby incorporated by reference in its entirety as though fully and completely set forth herein.

Terms

Hardware Configuration Program—a program consisting of source text that can be compiled into a binary image that can be used to program or configure hardware, such as an integrated circuit, for example.

Computer System—any of various types of computing or processing systems, including a personal computer system (PC), mainframe computer system, workstation, network appliance, internet appliance, personal digital assistant (PDA), grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Overview

A computer system that is capable of parallel processing may be composed of multiple data processing elements (PE), supporting memory (SM) units, and a high bandwidth interconnection network (IN) for moving data between and among individual PE, SM, and system I/O ports. The primary IN (or PIN) in such a system may be optimized for high bandwidth and low average delivery times (latency). However, PINs may not be optimized for guaranteed delivery (messages can block other messages resulting in "busy" signals). As a result, a PIN may not be suitable for the synchronization of tasks across a group of PEs. In some embodiments, an additional network may be added to the computer system for the purpose of synchronization. Such a network may allow for guaranteed delivery of messages, however, the network may add complexity, power dissipation, or physical size to the computer system. The embodiments illustrated in the drawings and described below may provide techniques to synchronize parallel processing elements within a computer system while minimizing the impact to the complexity, power dissipation and physical size of the computer system.

Parallel Processing

Older microprocessors and digital signal processors (DSPs) may execute one task at a time, which is commonly referred to as following a thread of execution. Seen from a processor's IPU unit, the thread of execution is a stream of instructions. In some embodiments, a single stream of results is generated in response to the stream of instructions. This mode of execution is commonly referred to as Single Instruction Single Data (SISD). In other embodiments, multiple arithmetic and logic units (ALUs) may be employed allowing for multiple streams of results. This mode of execution is commonly referred to as Single Instruction Multiple Data (SIMD). Larger microprocessors and DSPs may have a SIMD capability and, in various embodiments, software may be employed to exploit such parallelism to boost performance. For example, the used of SIMD may accelerate video compression and trans-coding, computer vision, speech recognition, and encryption.

SIMD instructions may allow for the efficient processing of instructions. The efficiency, however, may depend on the rate at which data is supplied to the ALUs. Typically, a number of data results from one SIMD instruction ranges from 2 to 8, and as the number of data results per SIMD increases, a number of bits included in each data item typically decreases. Efforts to increase that number of data items per SIMD instruction may result in various problems, including, but not limited to: providing multiple data items to the ALUs simultaneously from common memory, storing results from the ALUs simultaneously back into memory, extra power dissipation during operation, and additional leakage power dissipation when the extra ALUs are idle but powered up and ready.

More recent microprocessors and DSPs are able to execute multiple threads at the same time by means of multiple IPU as well as ALUs. What is replicated and whether it is specialized varies widely with each microprocessor/DSP design type. Because each thread may have an independent stream of instructions this mode of parallel operation is called multi-instruction multi-data (MIMD). Typical number of threads per processor is 2-4, though processors have been designed capable of 16 threads or more. Efforts to increase the number of threads per processor run into problems of getting simultaneous streams of instructions to multiple IPU from common memory and extra leakage power dissipation for extra registers, these being in addition to the problems of multiple data streams to feed the corresponding ALUs.

Multi-Processing

Multi-processor systems allow programmers to divide large tasks into multiple smaller tasks that can be executed in parallel. Parallel execution can be used to shorten the time to complete the large task, or to reduce the power consumption (by reducing the processor's clock frequency). If the clock frequency is reduced then the power supply voltage may also be reduced to save energy.

A multi-processor system may be employed in one of various computer systems. An embodiment of a computing system is illustrated in FIG. 1. In the illustrated embodiment, computing system 100 may be desktop computer, laptop computer, tablet computer, smartphone, or any other suitable system. Computing system 100 may, in various embodiments, include one or more embedded systems, such as, e.g., embedded system 110. In some embodiment, embedded system 100 may include one or more integrated circuits (ICs) such as, e.g., multi-processor IC 120. Although only one IC is depicted in embedded system 110, in other embodiments, different numbers of ICs may be employed, each of which may be configured to perform different functions.

Figure 2A:
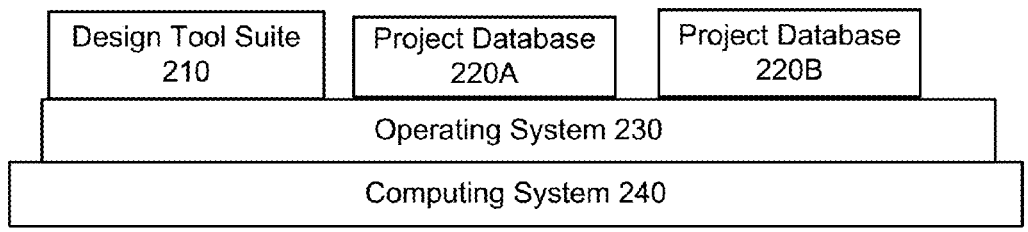
FIG. 2A is a block diagram illustrating an embodiment software and hardware hierarchy of a computing system.

Turning to FIG. 2A, a block diagram depicting an embodiment of software and hardware hierarchy is illustrated. At the bottom of the hierarchy, is computing system 240. In some embodiments, computing system 240 may correspond to computing system 100. Computing system 240 may, in various embodiments, be a desktop workstation, while in other embodiments, computing system 240 may be a laptop computer or other mobile device, and may include components such as displays, hard disk drives, network interface devices, and any other suitable components.

At the next level of the hierarchy, is operating system 250. In various embodiments, operating system 250 may be one of various types of operating systems, such as, e.g., Windows, Linux, Unix, and the like. Operating systems, such as operating system 250 may, in various embodiments, provide commands and program instructions necessary for application or user programs to access the hardware of computing system 240.

As described above, operating system 250 may provide access to hardware resources for other programs. In the illustrated embodiment, such programs include design tool suite 210, and project databases 220A and 220B. In some embodiments, design tool suite 210 may be configured to allow a user to configure hardware resources within computing system 240. As will be described in more detail below, such configuration may include storing control bits into one or more control registers within a multi-processor. The control bits may, in various embodiments, control the routing of information between processing elements of the multi-processor. In some embodiments, the control bits may also control synchronization between processing elements of a multi-processor.

Figure 2B:
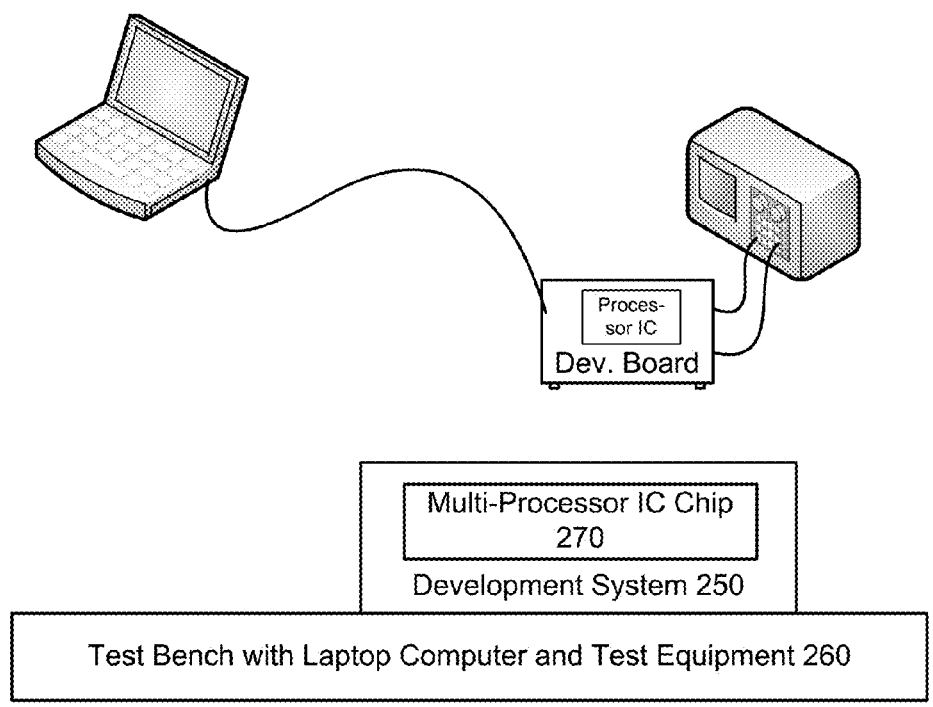
FIG. 2B is a block diagram illustrating a test and development system.

An embodiment of a test and development system is illustrated in FIG. 2B. In the illustrated embodiment, multi-processor IC 270 is included in a development system 250. Development system 250 is coupled to test bench 260. In various embodiments, test bench 260 may include test equipment, a laptop computer, and any other suitable equipment to aid in the test and development of multi-processor IC 270.

During operation, development system 250 may be used to determine how to configure multi-processor 270 for use with a given software application. In some embodiments, the configuration may include determining how to synchronize one or more processing elements within multi-processor 270 in order to allow the individual processing elements to exchange data during parallel processing.

It is noted that the embodiment illustrated in FIG. 2B is merely an example. In other embodiments, different numbers of multi-processor ICs and different test equipment may be employed.

Figure 3:
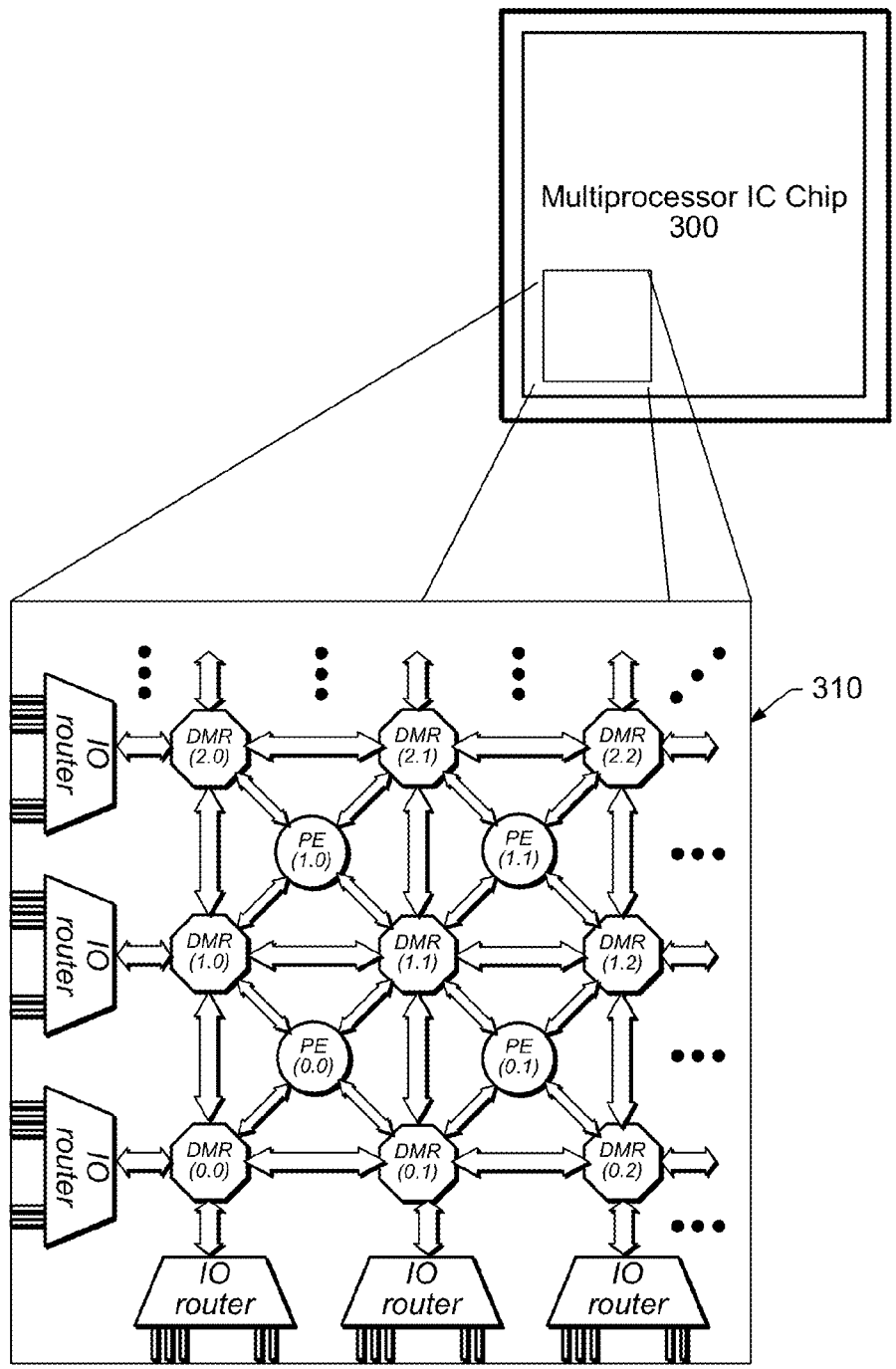
FIG. 3 is a block diagram illustrating an embodiment of a multiprocessor integrated circuit.

An embodiment of a multi-processor IC is illustrated in FIG. 3. In the illustrated embodiment, multi-processor IC 300 includes a processor array 310. Multi-processor IC 300 may, in other embodiments, also include other circuits and functional blocks (not shown). For example, multi-processor IC 300 may include and analog/mixed-signal block which may include oscillators, phase-locked loops (PLLs), internal power supply generation and regulation circuits, and the like.

During operation, program instructions stored in memory or on a hard disk drive or other suitable media, may be executed by processor array 310. In some embodiments, individual processing elements (PEs) within processor array 310 may be configured to execute certain program instructions. As described below in more detail, the execution of program instructions may, in various embodiments, be coordinated between PEs through the use of synchronization.

Figure 4:
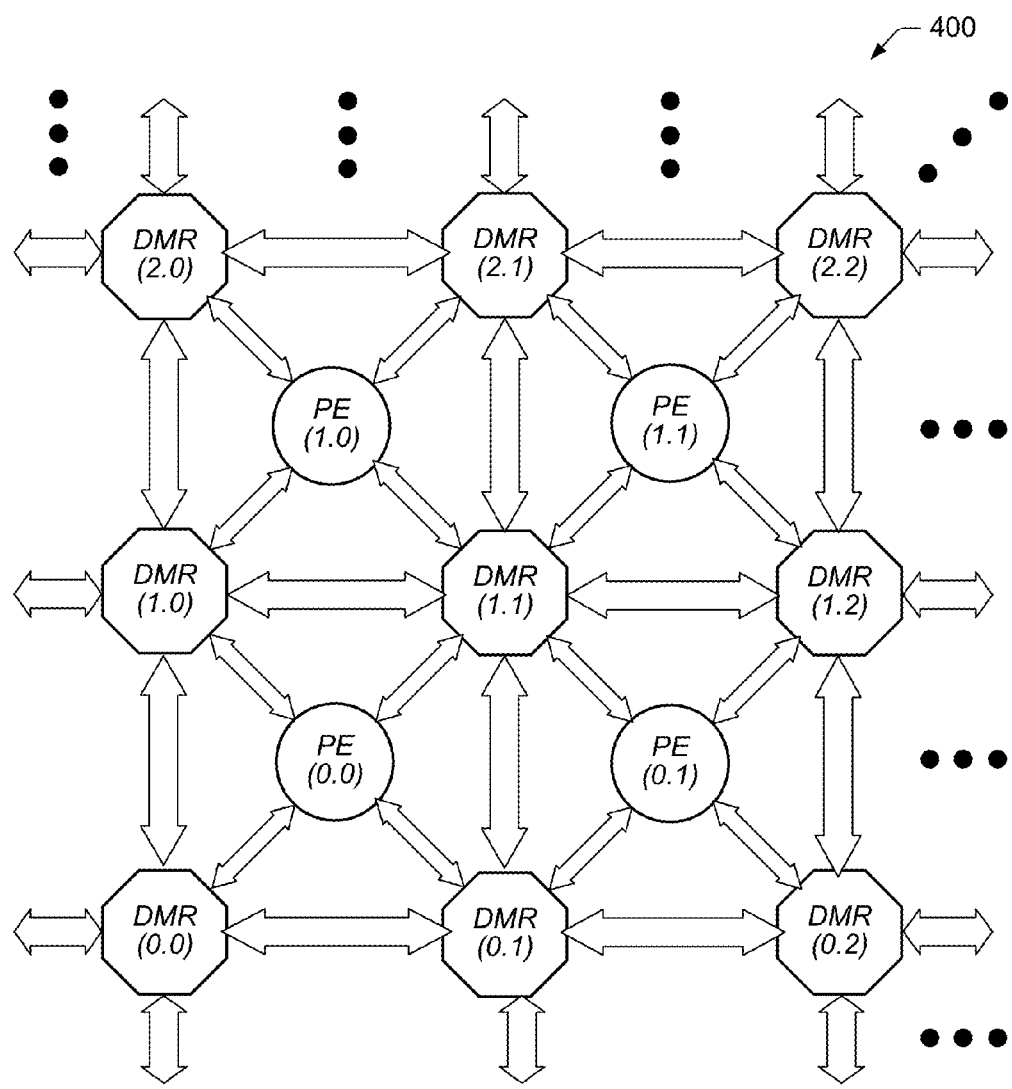
FIG. 4 is a block diagram illustrating an embodiment of a multiprocessor array.

Turning to FIG. 4, an example multi-processor array (MPA) is illustrated. In some embodiments, MPA 400 may correspond to processor array 310 of multi-processor IC 300 as illustrated in FIG. 3. In the illustrated embodiments, MPA 400 includes a plurality of processing elements (PEs) and a plurality of supporting memory (SM) and an interconnection network (IN). The IN is composed of switch nodes and links. Switch nodes, also referred to as routers, may be used with the links to form communication pathways between PEs and between PEs and MPA I/O ports. However, at each PE any information communicated may be buffered in SM. In the illustrated embodiment, SM is combined with the communication path routers called data-memory routers (DMRs). As used herein, a PE may also be referred to as a PE node, and a DMR may also be referred to as a DMR node. A DMR is also referred to herein as a "configurable communication element, or CCE."

The links between DMRs as illustrated in FIG. 4 form a rectilinear mesh. In other embodiments, however, many other connection schemes are possible and contemplated. In the MPA connection scheme illustrated in FIG. 4, each PE is connected to four neighbor DMRs, while each DMR is connected to four neighbor PEs as well as four neighbor DMRs. Other connection schemes are also envisioned to support higher dimensionality INs, such as the use of six DMR-to-DMR links per DMR to support a three dimensional rectilinear mesh, or eight links per DMR to support the four diagonal directions in addition to the north, east, south, and west directions. Links need not be limited to physically nearest neighbors.

The combination of an MPA and application software may, in various embodiments, be referred to as a parallel processing system (PPS). For example, an MPA may be programmed to buffer and analyze raw video data from a camera, then perform video data compression on the buffer contents for transmission of the compressed data out onto a radio link. This combination of application software and MPA may be referred to as a parallel video signal processor, for example.

MPA 400 with chip I/O cells may be used in any of various systems and applications where general-purpose microprocessors, DSPs, FPGAs, or ASICs are currently used. For example, the processing systems illustrated in FIG. 4 may be used in any of various types of computer systems, digital signal processors (DSP) or other devices that require computation.

It is noted that the MPA illustrated in FIG. 4 is merely an example. In other embodiments, different numbers of PEs and different connection mechanisms between PEs may be employed.

Synchronization

While multi-processing may allow for more program instructions to be executed simultaneously, multi-processing may create the need to synchronize smaller tasks at specific boundaries in time and space for efficient communication and coordination. Two or more tasks are synchronized when they begin on the same smallest tic of the system clock, also called clock cycle or just "cycle" for short. The synchronization of task may, in various embodiments, be difficult to implement synchronization with a small number of cycles.

As noted above the PIN does not guarantee message delivery, and as such, is unsuited for synchronization of a PE. An alternative is to employ a software barrier in each PE, and a shared memory location. When a PE reaches its barrier it increments the location value and then polls it periodically until the location value matches the expected number of PE that are to be coordinated. When employing such a technique, however, most PE architectures will not guarantee that a set of PEs will all continue beyond the barrier synchronized to the other PE within the same clock cycle.

In various embodiments, PE architectures might be able to synchronize tasks within a wide range of cycles, such as, e.g., 1 to 20 cycles, but the actual number of cycles in any particular instance depends on several factors beyond the normal control of programmers, such as the state of other active threads, the location of currently processed data in SM, caching, interrupt processing, etc.

In some embodiments, a synchronization network (also referred to herein as a "sync network") may be employed to synchronize task between one or more PEs of a MPA. While a primary interconnect network (PIN) of a multi-processor system may be composed of links and nodes wherein the nodes have ports to connect to the links and to interspersed processing elements (PE) and supporting memories (SM), a sync network may be composed of a set of sync controllers, a set of PE adapters and connections between them and a new instruction in each PE.

Figure 5:
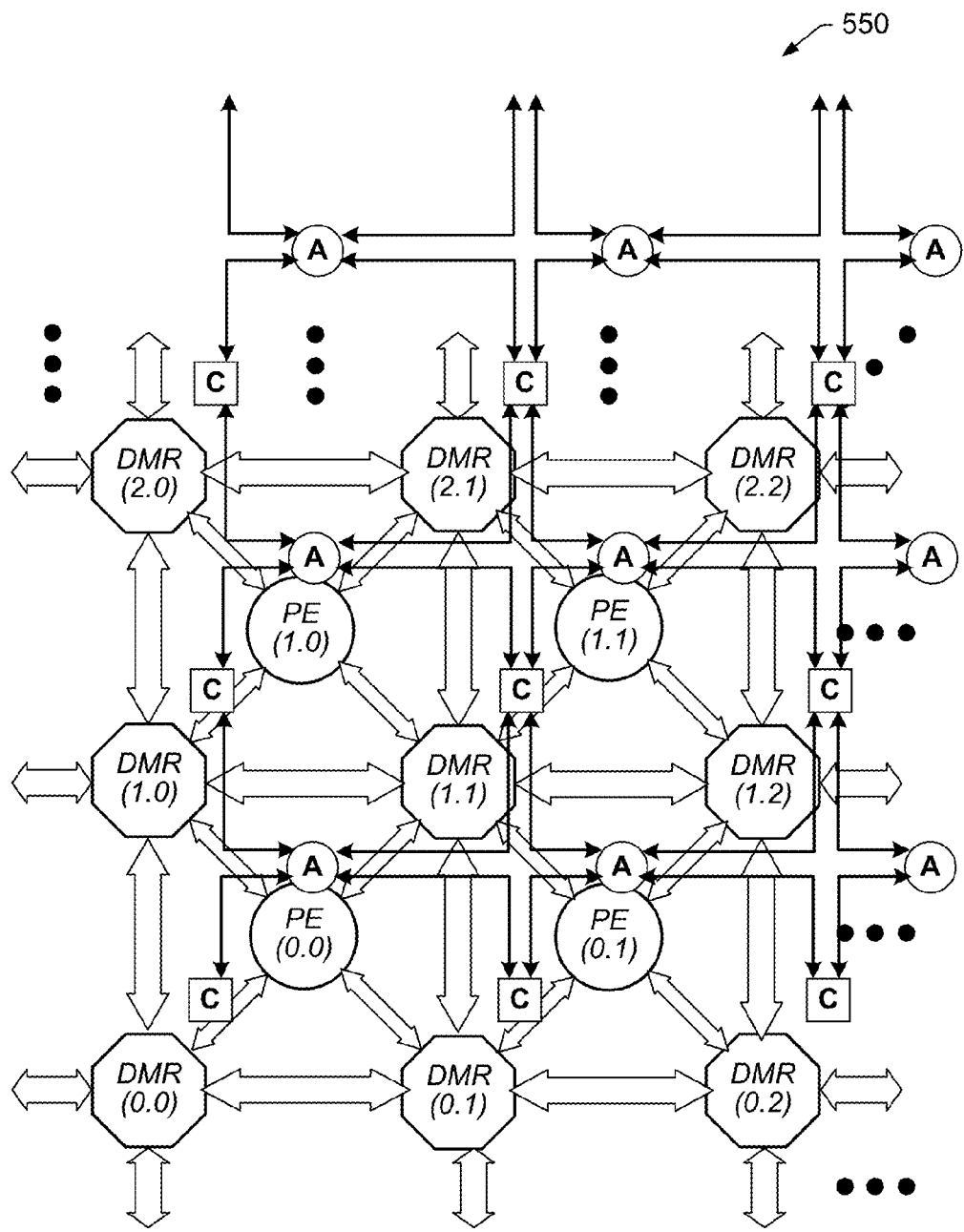
FIG. 5 is a block diagram illustrating an embodiment of a synchronization controller.

An embodiment of a MPA with a sync network is illustrated in FIG. 5. In the illustrated embodiment, a single sync controller (C) is used for each node in the PIN. The sync controllers in a system may all be identical. Each sync controller may have multiple ports each one to couple to a neighboring PE, and one port for configuration purposes. In some embodiments, the set of neighboring PE that are coupled to a sync controller may be the same set to which the nearest PIN node is coupled. The configuration port may be coupled to a SM location, a PE register, a secondary network for programming/debug, or any other means of supplying it with configuration data. The PE port on the sync controller has an inbound sync signal and an outbound sync_stall signal.

In some embodiments, each PE may employ a sync adapter (A) that has multiple ports, each one for coupling to a sync controller, plus its own PE. A sync adapter may, in some embodiments, be integrated into a PE, while in other embodiments, the sync adapter may be a separate entity. The different ports coupled to sync controllers may be discriminated by directions as seen from a PE, such as the compass directions NE, SE, SW, and NW in the case of four couplings. Each port on the adapter has an outbound sync signal and an inbound sync_stall signal. Other connection schemes between sync controller and adapters are also envisioned to support higher dimensionality INs. Links between sync controllers and sync adapters need not be limited to physically nearest neighbors.

It is noted that the sync network illustrated in FIG. 5 is merely an example. In other embodiments, different numbers of sync controllers and adapters, and different connections between sync controllers and adapters are possible and contemplated.

In some embodiments, software control of the synchronization between PEs may be employed. In such cases, a dedicated "sync" instruction may be included to the PE instruction set. In various embodiments, the assembly language format for such a instruction may be:

sync <direction list>

The <direction list> field may indicate a list, i.e., one or more, of sync controller directions to send (assert) a sync signal and then wait for a de-asserted sync_stall signal. A PE may wait until all sync_stall signals corresponding to the list have been de-asserted before executing the next instruction.

In some embodiments, if a sync controller is not configured to synchronize this PE to one or more other PEs then the sync_stall signal will remain de-asserted and the PE may not wait for the sync_stall signal. The sync controller may ignore sync from, and may not assert sync_stall to, a PE that is "masked" in the sync configuration register. In various embodiments, the sync configuration register may store information configuration information specific to a given application being executed by a MPA.

If the sync controller is configured to synchronize a given PE to one or more other non-masked PEs, and the non-masked PEs have not yet asserted their respective sync signals, then the sync controller may respond by asserting back the sync_stall signal. The given PE may then wait until the sync controller has received all non-masked PE sync signals and de-asserts all non-masked sync_stall signals.

It is noted that in various embodiments, a sync controller may be included as part of a DMR, while in other embodiments, each sync controller may be implemented as a standalone unit within an MPA.

Figure 6:
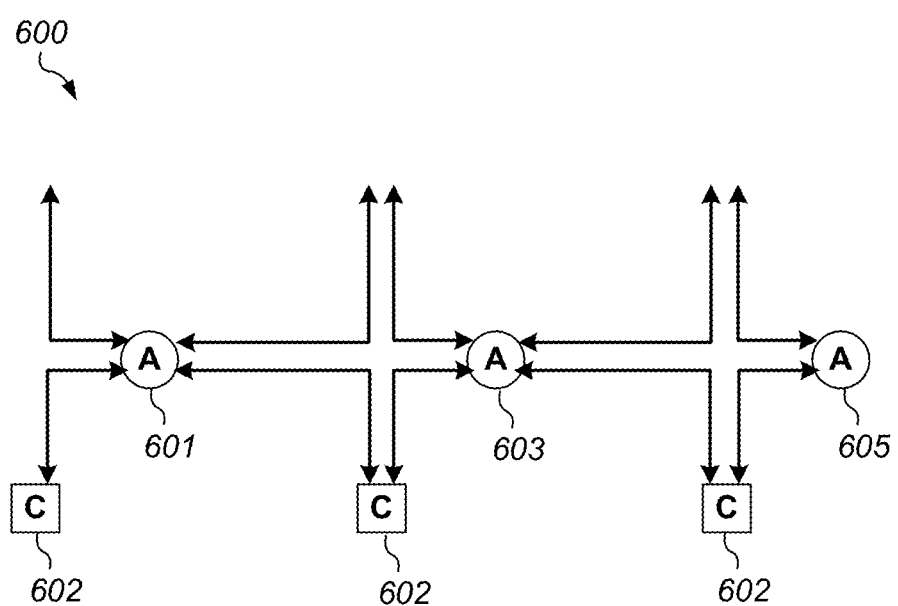
FIG. 6 is a block diagram illustrating another embodiment of a synchronization network.

Turning to FIG. 6, an embodiment of a portion of a sync network is illustrated. In the illustrated embodiment, sync network 600 includes sync adapters 601, 603, and 605, and sync controllers 602, 604, and 606. The connection between each sync controller sync adapter includes two wires. One wire may be used to communication a sync_request (SR) signal, while the other wire may be used to communication a sync_stall (SS) signal. In some embodiments, a SR signal may be sent from a sync adapter to a sync controller, and a SS may be sent from a sync controller to a sync adapter.

The two wires included in a connection between a given sync controller and a given sync adapter, may encoded four states. In the first state, both the SR and SS signals may be at a logic 0 level, indicating inactivity. The SR signal may be a logic 0 level and the SS signal may be a logic 1 level in the second state, indicating a sync barrier is activated, but not yet requested. In the third state, the SR and SS signals may both be at a logic 1 value indicating that the sync barrier is active and requested, but has not yet been completed. In the fourth state, the SR request signal may be at a logic 1 value and the SS signal may be at a logic 0 value indicating that the sync barrier has been completed.

It is noted that the embodiment illustrated in FIG. 6 is merely an example. In other embodiments, different numbers of sync adapter and sync controllers, as well as different configurations of the sync controller and sync adapters may be employed.

Figure 7:
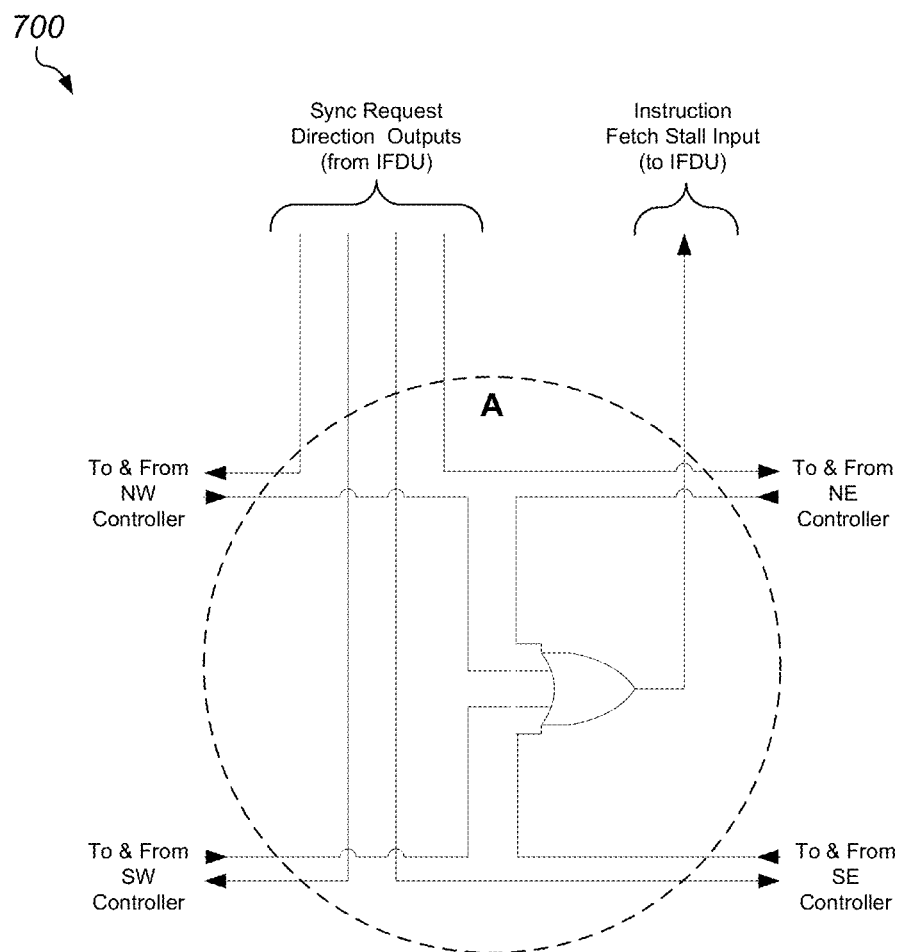
FIG. 7 is a block diagram illustrating an embodiment of a synchronization adapter.

An embodiment of a sync adapter is illustrated in FIG. 7. In the illustrated embodiment, sync adapter 700 includes OR gate 710 coupled. Sync adapter 700 may, in various embodiments, be included within a PE, while in other embodiments, sync adapter may be a separate entity within a MPA. Although sync adapter 700 includes an OR gate, in other embodiments, other logic gates and configurations of logic gates may be employed.

During operation, sync adapter 700 may mediate communication between a PE's instruction fetch and decode unit and neighboring sync controllers. SR signals received from a PE's instruction fetch and decode unit may pass through sync adapter 700 to the neighboring sync controllers. In some embodiments, the SR signals may be a function of a software instruction such as the instruction previously described. SS signals return from each of sync controllers and are logically combined by OR gate 710. The resultant signal may be used to stall the PE's instruction fetch and decode unit. In some embodiments, a single active SS signal from one of the neighboring sync controllers may be sufficient to delay instruction fetch for a next PE clock cycle.

It is noted that the sync adapter illustrated in FIG. 7 is merely an example. In other embodiments, different numbers of logic gates and different numbers of SR and SS signals are possible and contemplated.

Figure 8:
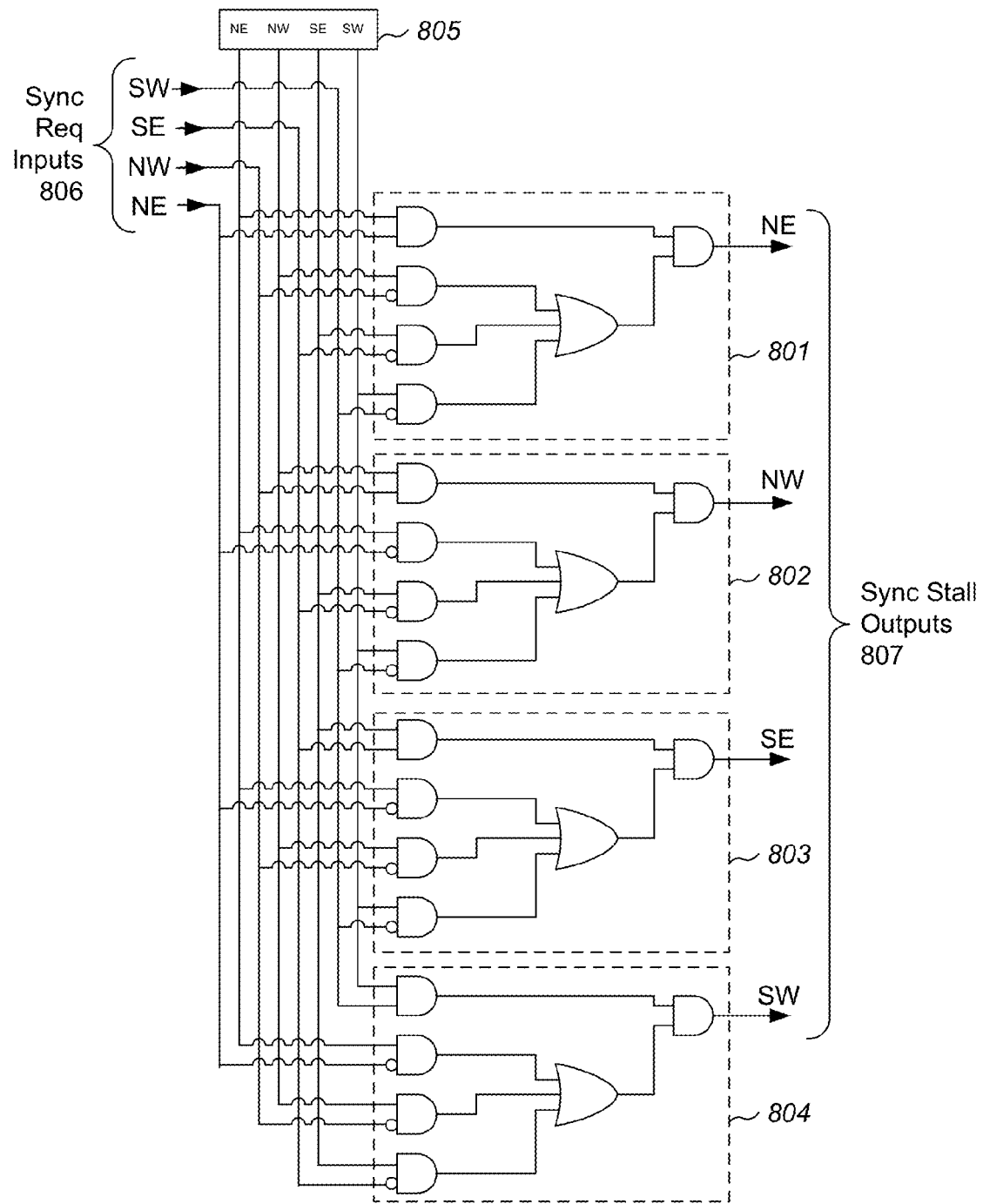
FIG. 8 is a block diagram illustrating an embodiment of a synchronization controller.

Turning to FIG. 8, an embodiment of a sync controller is illustrated. In the illustrated embodiment, sync controller 800 includes logic gates 801 through 804, and mask register 805. In some embodiments, mask register may be located externally to sync controller 800 or may a mapped location in memory. Registers such as those described herein may be a particular embodiment of a storage circuit configured to store one or more data bits. In some embodiments, a register may include one or more data storage cells such as, latches, flip-flops, and the like. Register 805 may include a mask bit corresponding to each "direction" of a corresponding PE. It is noted that while only four directions are depicted in the mask register 805, in other embodiments, different numbers of "directions" are possible and contemplated.

During operation, sync controller 800 receives SR signals 806 from neighboring sync adapter, such as, e.g., sync adapter 700 as illustrated in FIG. 7. Logic gates 801 through 804 may then generate SS signals 807 by combining the received SR signals. In some embodiments, configuration bits from mask register 805 may also be used in the generation of the SS signals 807. For example, if a mask bit is a logic 0, the input from the corresponding direction may be ignored and the SS signal corresponding to that direction may be set to a logic 0 level indicating that the corresponding PE is not stalled.

When a mask bit is at a logic 1 level, the state of the SS signal for the corresponding direction may depend on the SR signal from that direction and the output of the corresponding OR gate within the corresponding logic gates. When the mask bit is at a logic 0 level, the state of the corresponding SS signal and the corresponding SR signal will not affect the state of the SS signal.

When two or more mask bits are at a logic 1 level, the corresponding SS signals will be at a logic 0 level which may, in various embodiments, indicate a "no stall" condition, when the SR signals are at a logic 0 level. If the SR signal corresponding to the SS signal is at a logic 1 level, and at least one other SR signal is at a logic 1 level, the SS signal will be at a logic 1 level which may indicate a "stall" condition.

It is noted that "low," "low logic level" or "logic 0 level" refers to a voltage at or near ground and that "high," "high logic level" or "logic 1 level" refers to a voltage level sufficiently large to turn on a n-channel MOSFET and turn off a p-channel MOSFET. In other embodiments, different technology may result in different voltage levels for "low" and "high. It is further noted that the embodiment of a sync controller depicted in FIG. 8 is merely an example. In other embodiments, different logic gates and different configurations of logic gates may be employed.

It is noted that for any real processor array, there is a finite number, n, of PEs connected to a DMR, and this is the maximum number of PE that can be synchronized in one clock cycle by that DMR. In some embodiments, this number may be 4, although in other embodiments, different numbers may be employed. If there are t threads of execution per PE then t*n threads can be synchronized with a single DMR by multiplying the number of sync and sync_stall signals by t in each sync controller port and in each adapter port. To synchronize more than n PEs, different techniques may be employed.

By programming chains of carefully-constructed sync commands across a large group of PEs, one can synchronize any number of PEs, though not immediately in one clock cycle. The programming technique is to arrange for a stall barrier from the outermost PE in a group to some DMR that is central to the group, and then arrange for a release wave to propagate from the central DMR to the outermost PE. In some embodiments, no-operation instructions (commonly referred to as "nops") may be added to fine tune the synchronization.

Figure 9:
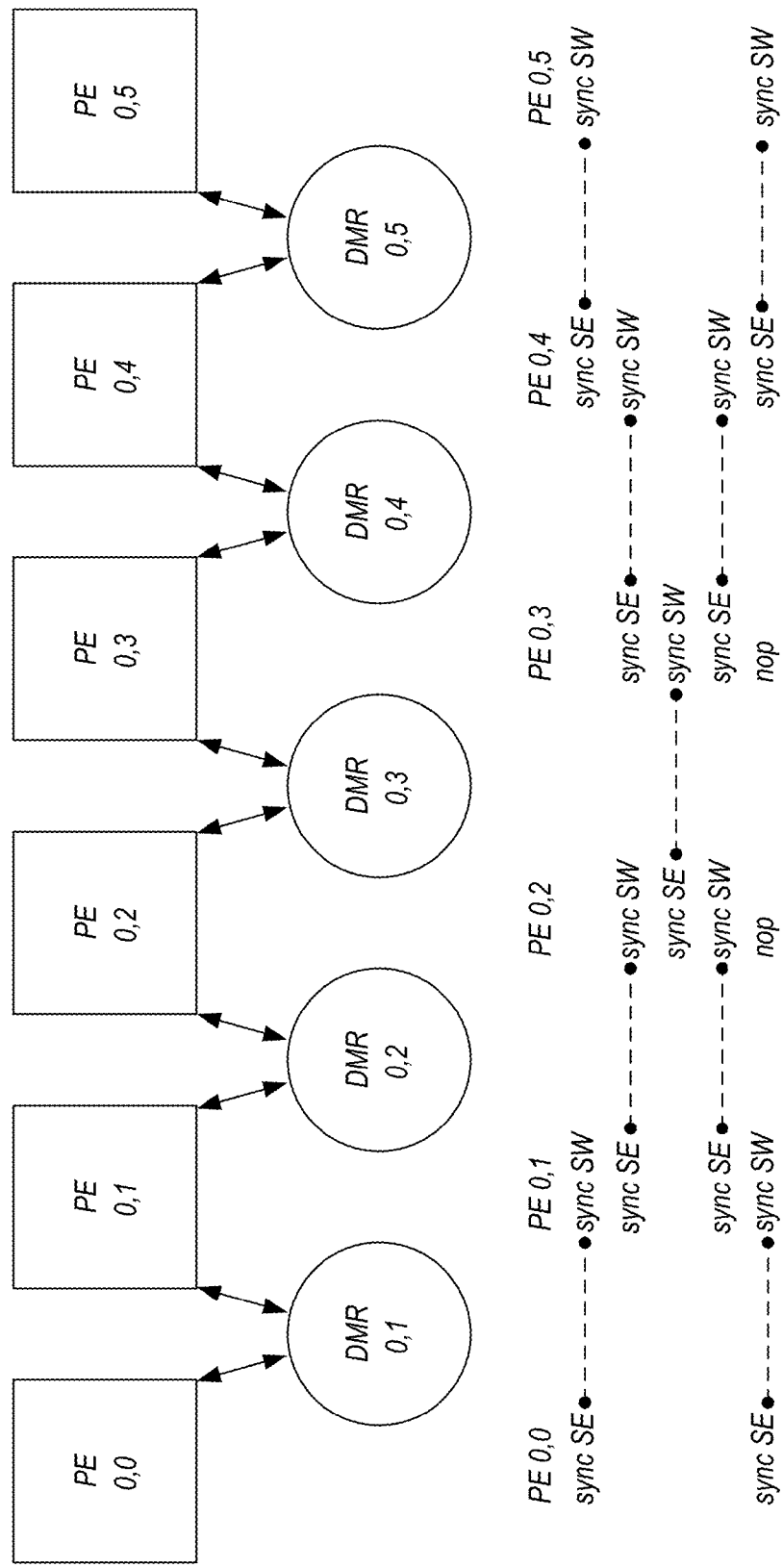
FIG. 9 is a block diagram illustrating synchronization chaining.

Turning to FIG. 9, an example describing the synchronization of six PEs arranged in a line is illustrated. It is noted that the PEs may be arranged in any shape, but that for the purposes of clarity, a line was chosen for the example.

For a line of PEs, DMRs may be used to synchronize pairs of PE as shown in FIG. 9. A given DMR may be configured to release a pair of PEs from sync_stall only when both the PEs at the DMR's NE and NW ports have issued a sync signal to the DMR. To prevent other PE from interfering, all five DMRs are configured to mask (ignore) their sync ports in the SW and SE directions (this is not shown on the diagram except by the absence of DMR connections in the SW, SE directions to other PE). The configuration of the DMRs is made in advance of the sync instructions by storing configuration bits in the Sync Configuration Register in each DMR.

The sync programming necessary to synchronize the six PEs depicted in FIG. 9 is also illustrated in FIG. 9. A set of instructions is listed below each PE. Each PE will execute the corresponding instructions from top to bottom. The dotted connector lines show which sync instructions for different PE are paired to operate together through a common DMR (a DMR connected to both PE in the pair). Each PE may arrive at the first sync instruction on a different clock cycle, but it is forced by the hardware to exit that sync instruction on the same clock cycle as the PE to which it is paired. In this particular chaining example PEs are paired, however, more than two PE may be synchronized in a single cycle as needed, subject to the DMR constraints described above.

Examining at the PE programming as illustrated in FIG. 9, it is noted that two chains that cross in the center. The first chain has a first link made of the first pair of sync instructions for PE00 and PE01, a second link made of the first pair of sync instructions between PE01 and PE02, a third link made of the only pair of sync instructions between PE02 and PE03, a fourth link made of the second pair of sync instructions between PE03 and PE04, and a fifth link made of the second pair of sync instructions between PE04 and PE05. The second chain is formed similarly but in mirror image to the first chain; and it begins with the link made by the first pair of sync instructions between PE05 and ends with the fifth link made by the second pair of sync instructions between PE00 and PE01.

Thus when PE01 is released from the stall at the first syncSW instruction, it will be caught by the first syncSE instruction, which by being paired with PE02's first syncSW instruction is the next link in the chain. Similarly in the column for PE02 when PE02 is released from the first syncSW instruction it will be caught by its first syncSE instruction, which by being paired with PE02's first syncSW instruction is the next link in the chain. And so forth.

Assume that each PE has a programmed task and that each of these tasks can take a different, and possibly random, amount of time; then the PEs are to exchange data to be ready for another iteration. To prepare for the data exchange, the PEs may be synchronized with the sync programming of FIG. 9.

As each PE ends its task, it executes the first sync instruction in its corresponding column in FIG. 9. If it is the first PE to hit a sync instruction in a chain, then it waits. More PE arrive at the upper half of each chain causing links to be released, where upon each PE proceeds to the next sync instruction, which is in a lower half chain, and waits. Eventually the upper part of both chains release and the link across the center DMR 03 is released. Since all of the PE are now waiting on the lower half chains, these chains release PE in quick succession at a rate of one link per cycle.

As shown, it may be necessary to have inner PEs wait for the outermost PE to be released during the outward moving wave of sync exits. This may be programmed by adding nops after the sync instruction where exit occurs. When a PE executes a nop instruction it waits one clock cycle. The number of nops to use in the program for each PE is computed knowing that the outward moving sync executions will take exactly one clock cycle each. Since each outward moving sync execution takes one cycle and all nops take one cycle and no PEs are executing any code that could potentially stall, all PEs may be released in a synchronous manner. The programming shown in the diagram will guarantee that all PEs will exit the instruction sequence on the exact same clock cycle.

The technique is scalable to MPAs with thousands of PE. For example, a square array of 2025 PE has an edge length of 45 PE or 44 PE-to-PE hops, and a diagonal Manhattan (staircase) distance of 88 hops. Sync chains can be set up in a radial fan pattern to cover the entire area. The chains that run from corner-to-corner are 88 hops long and these determine the worst-case time interval to synchronize all 2025 PE, which is 88 clock cycles. In operation PE's stall as they encounter sync instructions, and eventually this is communicated to the center of the array. The stalls are released from the center in a wave that propagates radially outward. No-ops may be needed to delay the PEs nearer the center until the wave reaches the corners. Then all PE may start subsequent instructions on the same clock cycle.

The sync instruction may be used to coordinate a group of processors with distributed supporting memory to execute a parallel program. There are many different types of parallel programs.

This instruction may allow programmers to put multiple processors in a large MPA into lock-step execution. This may greatly enhance the utility of the parallelism of such arrays, especially for real-time processing tasks, and operation in a systolic mode. Systolic mode is a programming method where the MPA is programmed to have a heartbeat that may be one or more cycles long. In each heartbeat some data items are received by each PE, some operations are performed, and the result is output to neighboring PE. Systolic mode requires little memory per PE and has been applied to matrix mathematics, filtering, and image processing applications, to name a few. Systolic mode in one dimension is usually referred to as pipelining. These and other parallel programming methods help programmers to divide the computational effort of a large single task into many smaller tasks.

In conventional computer/DSP systems with Single Instruction Multi-Data (SIMD) capability the parallelism is limited by the number of data items that can be made available to the ALUs in one PE cycle. Typically this number has a fixed maximum—typically 2-8 for a microprocessor and perhaps up to 128 in a supercomputer. A conventional multi-processor system capable of MIMD parallelism may be programmed with the same instructions in each of its multiple instruction streams; however, this alone does not guarantee that the PE involved will start or remain in lock-step execution.

By employing sync instruction chaining, starting a large group of PE may, in some embodiments, be started on the same cycle, and overcomes the SIMD limitation on the number of ALU that execute the same instruction at the same time. It enables but does not guarantee that multiple PE remain in lock-step through the execution of multiple copies of the same task. PE may remain in lock-step only if they do not have cycle count dependencies on the data values, wait states due to interference for data memory or communication resources, interrupts, breakpoints, etc. Careful programming may be required to achieve lock step execution for extended periods. However, if this is not successful then multiple threads may be periodically resynchronized by the methods described above.

The hardware (and thus power) impact is very low for the added Sync Instruction capability. PE that are not needed may be shut down. Thus power is used only upon algorithm need, not as a part of the overhead power that is required to have SIMD instructions implemented but not always utilized.

Figure 10:
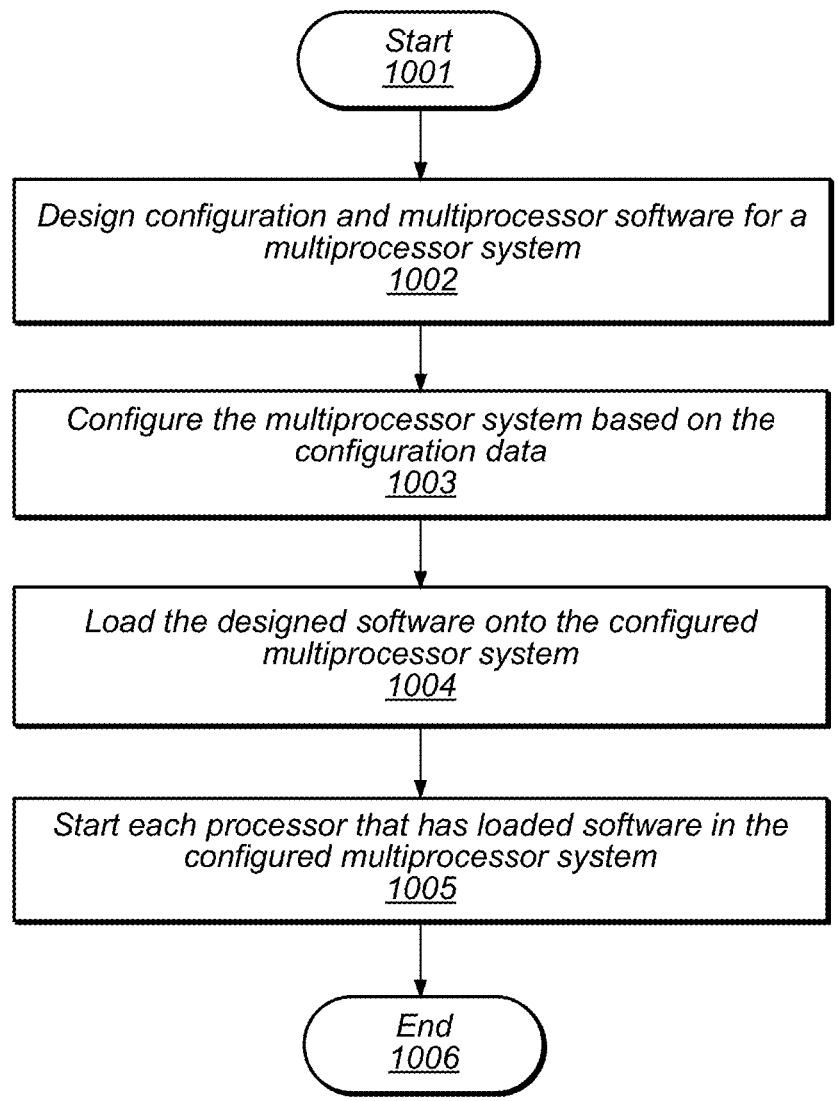
FIG. 10 is a flow diagram depicting an embodiment of a method for operating a multiprocessor array.

Turning to FIG. 10, an embodiment of a method for operating a multiprocessor array, such as array MPA 500 as depicted in FIG. 5, is illustrated. The method begins in block 1001. A configuration and software may then be designed for a multiprocessor system (block 1002). In some embodiments, the software may be any one of various application programs whose individual program instructions may be able to run on an individual PE within an MPA. The configuration may, in some embodiments, include synchronization instructions and settings to allow for common points in time for PEs to exchange data.

Once the design of the software and configuration has been completed, the multiprocessor system may then be configured (block 1003). In some embodiment, the configuration of the multiprocessor system may include storing information in configuration registers such as, e.g., register 805 as illustrated in FIG. 8. In other embodiments, configuration data may be stored in one or more memories included within the multiprocessor system.

With the configuration of the multiprocessor array complete, the previously designed software may then be loaded onto the multiprocessor system (block 1004). In some embodiments, the software may be loaded into one or more memories included within the multiprocessor system. The software may, in other embodiments, be stored on computer-accessible media, such as, e.g., a hard disk drive, a CD, or any other suitable storage media.

Once the software has been loaded into the multiprocessor system, the individual PEs of the multiprocessor are then started (block 1005). In some embodiments, each PE may execute a specific set of instructions included within the loaded software. Each PE may, in various embodiments, halt execution of instructions pending the completion of instructions being executed by other PEs within the multiprocessor system. With the PEs executing instructions, the method may then conclude in block 1006.

It is noted that the method depicted in FIG. 10 is merely an example. In other embodiments, different operations and different orders of operations may be employed.

Figure 11:
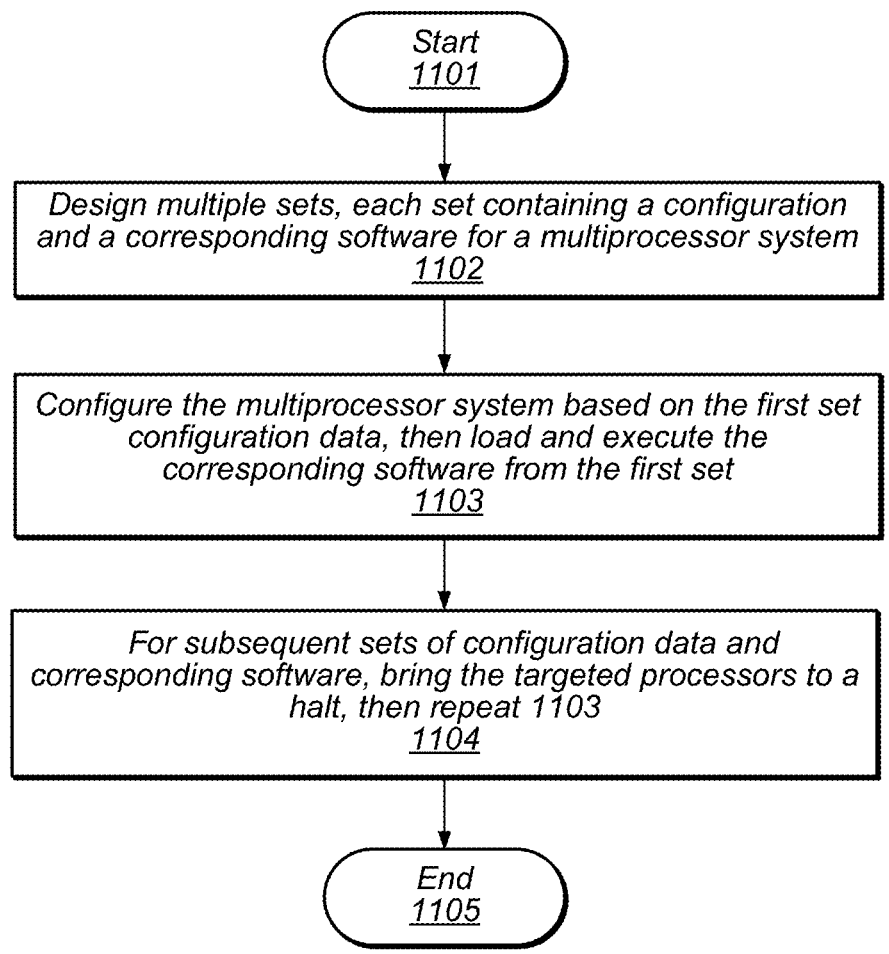
FIG. 11 is a flow diagram depicting an embodiment of another method for operating a multiprocessor array.

Another embodiment of a method for operating a multiprocessor system is illustrated in FIG. 11. The method begins in block 1101. Multiple sets for operating the multiprocessor system may then be designed (block 1102). In some embodiments, each set may include configuration data and a software application. The configuration data may, in various embodiments, be unique to the particular software application included in the set.

With the multiple sets defined, the multiprocessor system may be configured based on configuration data of a first set of the multiple sets and then execute the corresponding software application (block 1103). In some embodiments, different PEs within the multiprocessor system may execute different instructions that are part of the software application.

When the software application from the first set has been executed, the multiprocessor system may then be configured with data from a subsequent set of the multiple sets (block 1104). A corresponding software application may be run with newly configured multiprocessor system. In some embodiments, the processors executing the tasks of the corresponding software application may be brought to a halt, and the method may proceed from block 1103 as described above. The method may then conclude in block 1105.

It is noted that method illustrated in FIG. 11 is merely an example. In other embodiments, different operations and different orders of operations are possible and contemplated.

Figure 12:
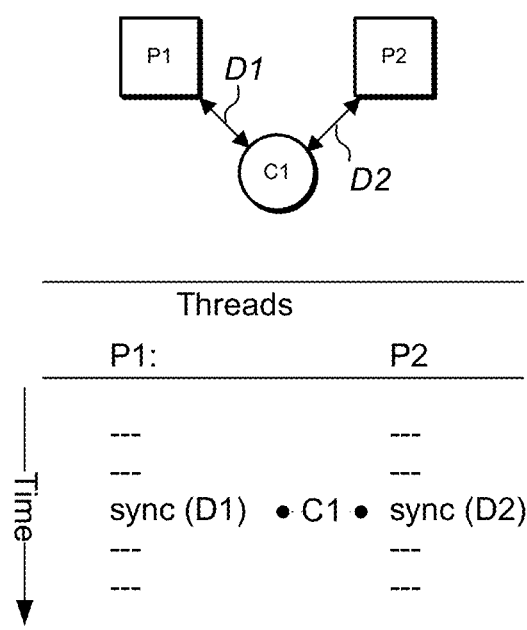
FIG. 12 is a block diagram illustrating the synchronization between two processing elements of a multiprocessor array.

Turning to FIG. 12, a block diagram depicting an embodiment of the synchronization of two PEs of a multiprocessor system is illustrated. In the illustrated embodiment, processing elements P1 and P2 are coupled to a synchronization controller C1, through directions D1 and D2, respectively. Each thread being processed by PEs P1 and P2 include a synchronization instruction. In some embodiments, the synchronization instruction may include a direction, such as described in more detail above.

During operation, the multiprocessor system may be configured and a software application may be loaded and executed. As PEs P1 and P2 are executing their respective designated tasks, the synchronization instructions may be encountered. The first PE to encounter a synchronization instruction may halt execution until the other PE encounters its respective synchronization instruction. At that time, the two PE may exchange data, and then resume execution of their respective threads.

It is noted that the embodiment illustrated in FIG. 12 is merely an example. In other embodiments, different numbers of PEs and different numbers of synchronization controllers may be employed.

Figure 13:
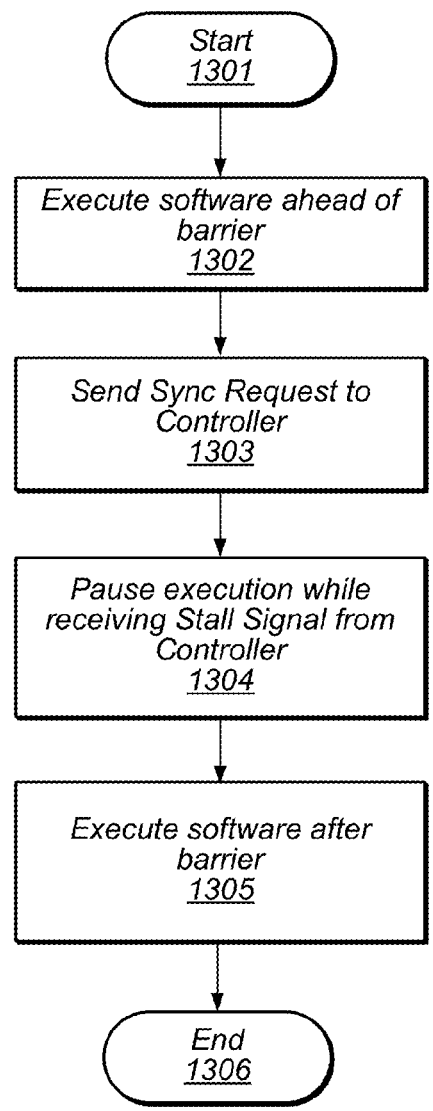
FIG. 13 is a flow diagram depicting an embodiment of a method for synchronizing processing elements of a multiprocessor system.

A flow diagram illustrating an embodiment of a method for synchronizing PEs within a multiprocessor system is depicted in FIG. 13. Referring collectively to the block diagram of FIG. 12 and the flowchart of FIG. 13, the method begins in block 1301. Software instructions prior to a synchronization barrier may then be executed by processors P1 and P2 (block 1302).

Processor P1 may then encounter a synchronization instruction, and in response to the synchronization instruction, send a synchronization request to controller C1 (block 1303). In some embodiments, locations may be identified in the software that each require synchronization between instruction threads being executed by different processors within a multiprocessor system.

Once processor P1 has sent the synchronization instruction, processor P1 may then halt execution responsive to a stall signal generated by controller C1 (block 1304). Although a single controller is illustrated in FIG. 12, in other embodiments, a processor may be coupled to multiple controllers, and a stall signal from any one of the multiple controllers may halt the execution of further program instructions. In various embodiments, the stall signal may be de-assert once controller C1 receives synchronization requests from both processor P1 and processor P2. When controller C1 receives synchronization requests from both processors, both processors have reached the synchronization barrier, and are said to be "in sync." Controller C1 may, in various embodiments, determine when to de-assert a stall signal in a fashion similar to the method described below in regards to FIG. 15.

With the de-asserting of the stall signal, processor P1 may the resume execution of the software after the synchronization barrier (block 1305). At that point, the method may conclude in block 1306. Although only synchronization request is depicted in the method illustrated in FIG. 13, in other embodiments, multiple synchronization instructions may be inserted into a given processor's instruction thread. Additional synchronization instructions may, in some embodiments, allow for larger numbers of processors within the multiprocessor system to be synchronized.

It is noted that the method illustrated in FIG. 13 is merely an example. In other embodiments, different operations and different orders of operations may be employed.

Figure 14:
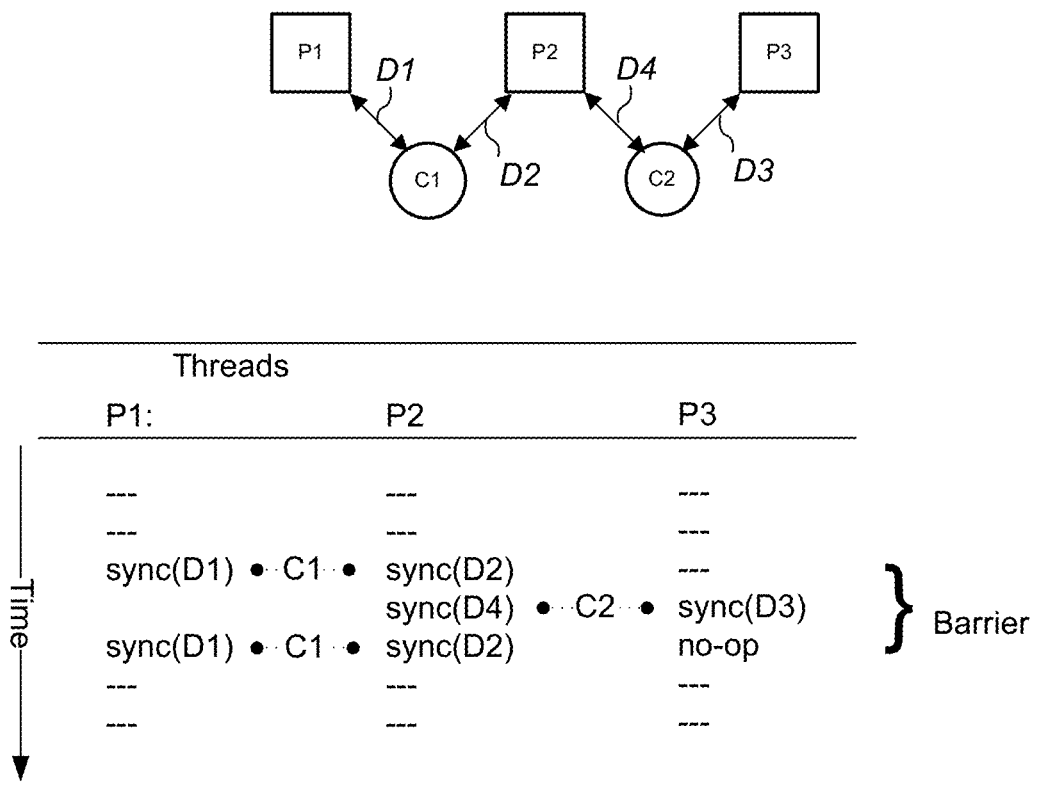
FIG. 14 is a block diagram illustrating the synchronization between three processing elements of a multiprocessor system.

Turning to FIG. 14, a block diagram depicting an embodiment of the synchronization of three PEs of a multiprocessor system is illustrated. In the illustrated embodiment, processing element P1 is coupled to synchronization controller C1 through direction D1, processing element is coupled to synchronization controllers C1 and C2 through directions D2 and D4, respectively, and processing element P3 is coupled to synchronization controller C2 through direction D3.

During design phase, a configuration is designed for operating the three PEs. In some embodiments, the configuration may include data bits to be loaded into mask registers in synchronization controllers C1 and C2. The data bits may determined in accordance with the directions D1 through D4 as described above. For example, a register in C1 may be configured to mask all directions except directions D1 and D2. The design may also include determining where synchronization instructions need to be inserted in the instruction threads of the associated software. The data bits and synchronization instructions may together form a barrier, i.e., a place in time where each of the three processing elements wait until all the threads arrive at that point.

The configuration data and associated software may then be loaded into the multiprocessor system. Once loaded instructions targeted (also referred to as a thread) for each of P1, P2, and P3 may be executed. When P1 encounters a synchronization instruction, P1 may halt execution of its thread until P2 encounters a synchronization instruction in the D2 direction. In a similar fashion, when P3 encounters a synchronization instruction, it may halt execution of its thread until P2 encounters a synchronization instruction in the D4 direction.

If the synchronization instructions for P1 and P3 arrive before any synchronization instructions for P2, then the arrival of the synchronization instruction in the D2 direction allows P1 to advance to its second synchronization instruction in the D1 direction in the next clock cycle. Also in the next clock cycle, when P2 encounters the synchronization instruction in the D4 direction, this allows P3 to advance to its second synchronization instruction in the D3 direction. In a third clock cycle, the arrival of P2 at a synchronization instruction in the D2 direction allows resynchronization with P1 in one cycle. In some embodiments, a no-op instruction may be desirable for P3.

In the case where P1 arrives at the barrier after P2, then P2 waits at its sync(D2) instruction until P1 arrives. If P3 arrives at the barrier after P2, then P2 waits at its sync(D4) instruction until P3 arrives at the barrier.

It is noted that the embodiment illustrated in FIG. 14 is merely an example. In other embodiments, different numbers of PEs and controllers may be employed.

Figure 15:
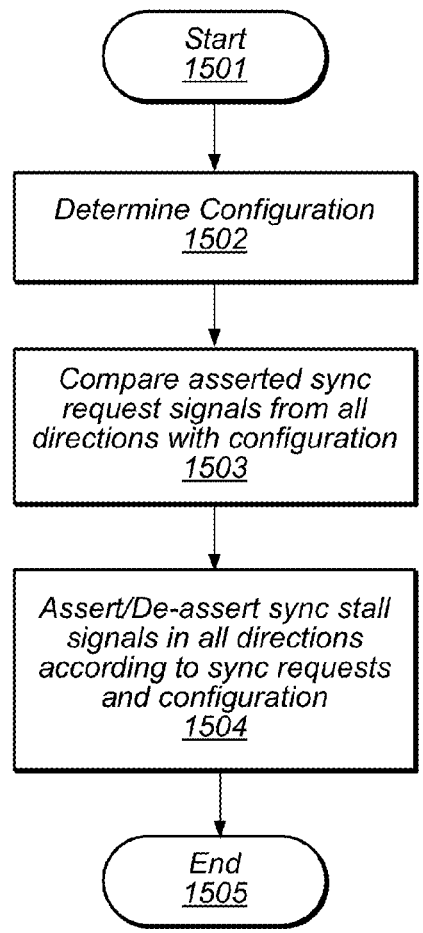
FIG. 15 is a flow diagram depicting an embodiment of a method for operating a synchronization controller in a multiprocessor system.

Turning to FIG. 15, a flowchart depicting an embodiment of a method for operating a synchronization controller, such as, e.g., the synchronization controller of FIG. 8, is illustrated. The method begins in block 1501. The configuration may then be determined (block 1502). In some embodiments, the configuration data may be included in a register, such as, e.g., register 805 as illustrated in FIG. 8. The configuration data bits stored in such a register may, in various embodiments, be decoded to determine from which direction to allow the receipt of synchronization information. Each direction may correspond to a respective one of a neighboring processor.

Asserted synchronization requests from all directions may then be compared to the configuration (block 1503). In some embodiments, the comparison may be performed using a logic circuit such as, e.g., logic circuit 801 as illustrated in FIG. 8. The synchronization stall signals may then be asserted or de-asserted according to the received synchronization requests and the configuration (block 1504). In some embodiments, a logic circuit, such as logic circuit 801 of FIG. 8, may logically combine one or more synchronization requests and configuration information to determine when a given stall signal should be assert or de-asserted. It is noted that, in some embodiments, more than one synchronization stall signal may be asserted and de-asserted at any given time. The method may then conclude in block 1505. Although the flowchart illustrated in FIG. 15 describes a single application of the operations depicted therein, in various embodiments, the method of FIG. 15 may constantly be performed during the operation of a multiprocessor system.

It is noted that the method illustrated in FIG. 15 is merely an example. In other embodiments, different numbers of synchronization requests and configuration data bits are possible and contemplated.

Figure 16:
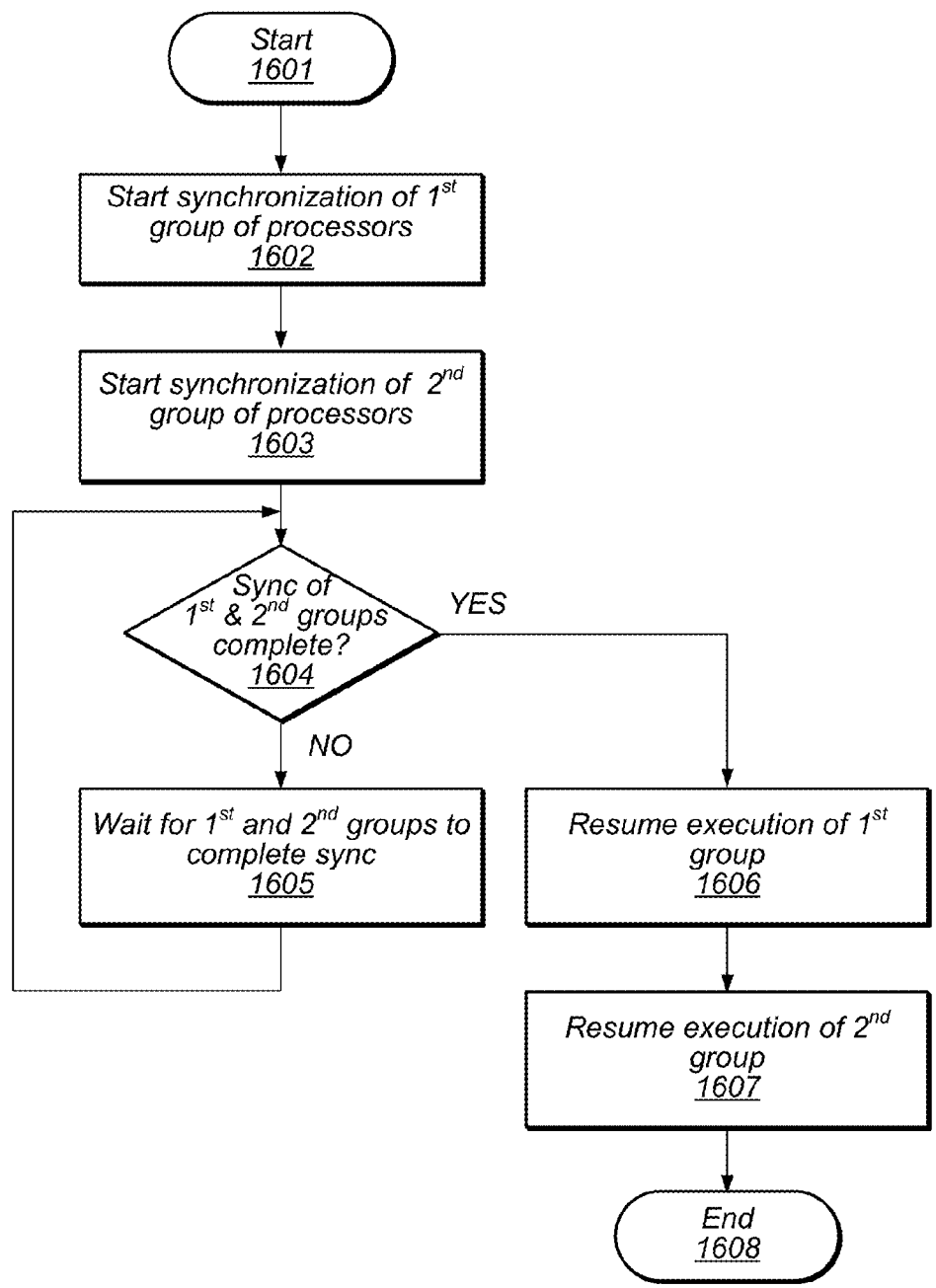
FIG. 16 is a flow diagram depicting an embodiment of a method for synchronizing two groups of processors in a multiprocessor system.

A flowchart depicting an embodiment of a method for synchronizing two groups of processors in a multiprocessor system is illustrated in FIG. 16. The method begins in block 1601. A synchronization of a first group of processors of the multiprocessor system may then be started (block 1602). In some embodiments, the synchronization of the first group of processors may include operations similar those described above in regards to the methods described in FIG. 13 and FIG. 15. The first group may, in various embodiments, include one or more processors of the multiprocessor system. In some embodiments, the synchronization of the first group of processors of the multiprocessor system may require multiple clock cycles to complete.

A synchronization of a second group of processors may also be started (block 1603). Like the synchronization of the first group, the synchronization of the second group of processors may include operations similar those described above in regards to the methods described in FIG. 13 and FIG. 15. The second group may, in various embodiments, include one or more processors of the multiprocessor system excluding the processors included in the first group. In some embodiments, one or more processors may be shared between the first group and the second group. As with the synchronization of the first group, the synchronization of the second group may require multiple clock cycles to complete.

The method may then depend on the status of the synchronization operations of the first group and second group (block 1604). When either one or both of the synchronization operations has not completed, further execution by the two groups of processors remains halted (block 1605). Once both synchronization operations have completed, the first group of processors may resume execution of program instructions (block 1606). The second group of processors may also resume execution of program instructions (block 1607). Once both groups of processors have resumed execution, the method may conclude in block 1608. It is noted that the two resume execution operations are depicted as being performed in a serial fashion. In other embodiments, these operations may be performed in parallel on in the reverse order. Other operations and other orders of operations may also be employed in alternative embodiments.

Figure 17:
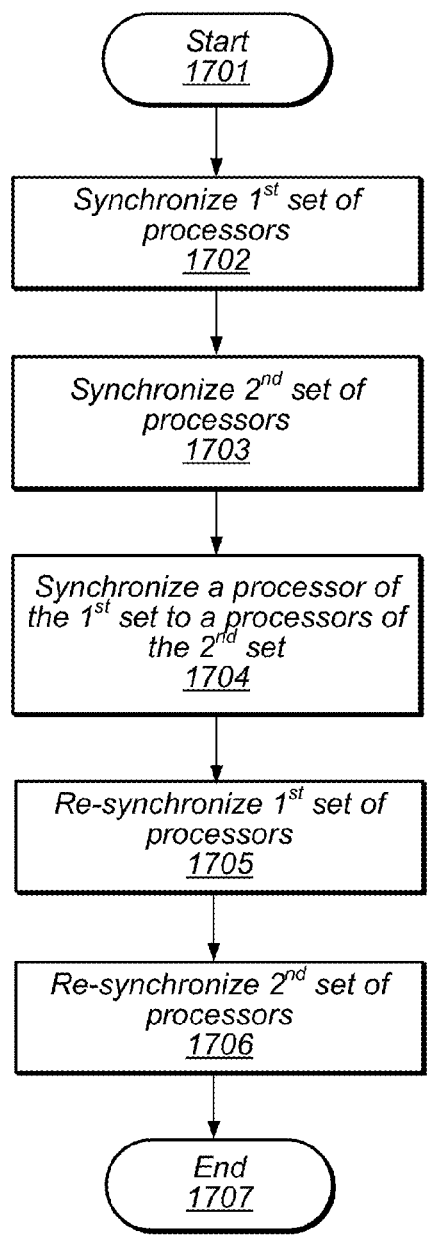
FIG. 17 is a flow diagram depicting an embodiment of a method for synchronizing two sets of processors in a multiprocessor system.

Turning to FIG. 17, a flowchart depicting an embodiment of a method for synchronizing two sets of processors in a multiprocessor system is illustrated. The method begins in block 1701. A first set of processors of the multiprocessor system may then be synchronized (block 1702). In some embodiments, the synchronization may include operations similar those described above in regards to the methods described in FIG. 13 and FIG. 15. Each processor included in the first set of processors may, in various embodiments, be coupled to a common synchronization controller, such as, e.g., the synchronization controller illustrated in FIG. 8.

Once the first set of processors of the multiprocessor system has been synchronized, a second set of processors of the multiprocessor system may then be synchronized (block 1703). In various embodiments, each processor of the second set may be coupled to a common synchronization controller. As with synchronizing the first set of processors, synchronizing the second set of processors may include operations similar those described above in regards to the methods described in FIG. 13 and FIG. 15.

With the completion of the synchronization of the second set of processors, a processor from the first set of processors may be synchronized to a processor of the second set of processors (block 1704). In some embodiments, the processor from the first set of processors and the processor from the second set of processors may be coupled to a common synchronization controller.

Once the processor from the first set and the processor from the second set have been synchronized, the first set of processors may then be re-synchronized (block 1705). The second set of processors may also then be re-synchronized (block 1706). It is noted that while the two re-synchronization operations are shown as being performed in a serial fashion, in other embodiments, the operation may be performed in parallel or in the reverse order. The method may then conclude in block 1707. By employing the method depicted in FIG. 17, any number of processors of the multiprocessor system may, in various embodiments, be synchronized.

It is noted that the method depicted in the flowchart of FIG. 17 is merely an example. In other embodiments, different operations and different orders are operations are possible and contemplated.

Figure 18:
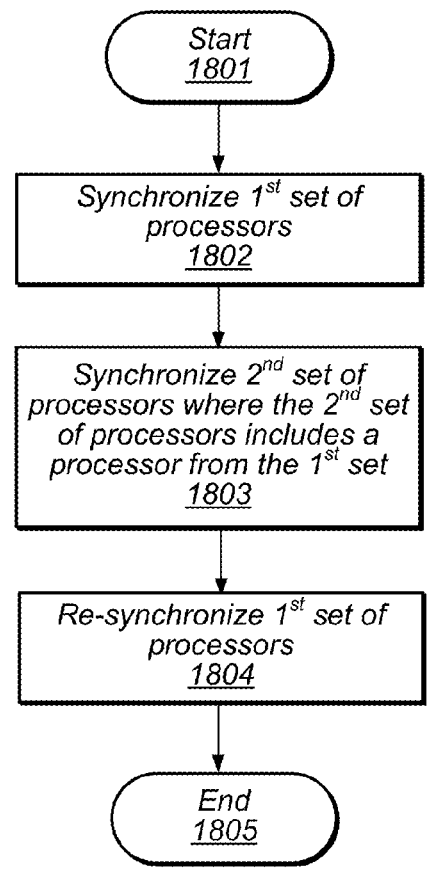
FIG. 18 is a flow diagram depicting an embodiment of a method for synchronizing two sets of processors in a multiprocessor system.

Another embodiment of a method for synchronizing two sets of processors of a multiprocessor system is illustrated in the flowchart of FIG. 18. The method begins in block 1801. A first set of processors of the multiprocessor system may then be synchronized (block 1802). In some embodiments, the synchronization may include operations similar those described above in regards to the methods described in FIG. 13 and FIG. 15. Each processor included in the first set of processors may, in various embodiments, be coupled to a common synchronization controller, such as, e.g., the synchronization controller illustrated in FIG. 8.

Once the first set of processors of the multiprocessor system has been synchronized, a second set of processors of the multiprocessor system may then be synchronized (block 1803). In various embodiments, each processor of the second set may be coupled to a common synchronization controller, and at least one processor included in the second set of processors is also included in the first set of processors. As with synchronizing the first set of processors, synchronizing the second set of processors may include operations similar those described above in regards to the methods described in FIG. 13 and FIG. 15.

With the completion of the synchronization of the second set of processors of the multiprocessor system, the first set of processor may then be re-synchronized (block 1804). In some embodiments, the inclusion of the at least one processor in the first and second sets of processors may allow for all of the processors in both the first and second sets to by synchronized. With the completion of the re-synchronization of the first set of processors, the method may then conclude in block 1805. By employing the method depicted in FIG. 18, any number of processors of the multiprocessor system may, in various embodiments, be synchronized.

It is noted that the flowchart illustrated in FIG. 18 is merely an example. In other embodiments, alternate operations may be employed.

Figure 19:
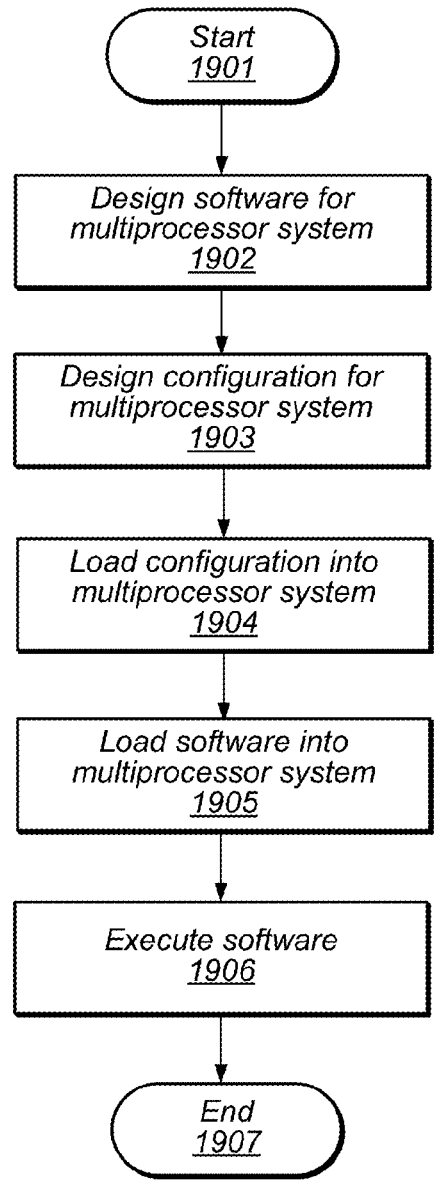
FIG. 19 is a flow diagram depicting an embodiment of a method for designing software for multiprocessor system.

A flowchart depicting an embodiment of a method for designing software for a multiprocessor system is illustrated in FIG. 19. The method begins in block 1901. Software may then be designed for a multiprocessor system, such as, e.g., multiprocessor IC 300 as illustrated in FIG. 3 (block 1902). The software may, in various embodiments, include applications for processing graphics or video data, or any other suitable application that may be mapped onto an array of processors. In some embodiments, locations within instruction threads for individual processors that require synchronization with other instructions threads may be identified. Synchronization instructions such as those previously described, may be inserted into the instruction threads to form a synchronization barrier and to enable synchronization between one or more processors within the multiprocessor system.

Once the synchronization instructions have been inserted, configuration data may then be designed (block 1903). In some embodiments, the configuration data may include configuration data bits that enable a synchronization controller to accept synchronization requests from one or more processors coupled to the synchronization controller. Each bit of a given set of configuration bits may, in some embodiments, represent a corresponding direction to a coupled processor while, in other embodiments, a given set of configuration bits may be decoded in order to determine allowed directions for synchronization input.

The configuration data may then be loaded into the multiprocessor system (block 1905). In some embodiments, portions of the configuration data may be loaded into registers within controllers, such as, e.g., register 805 as illustrated in FIG. 8. The configuration data may, in other embodiments, be loaded into one or more memories within the multiprocessor system.

The designed software may then be loaded into the multiprocessor system (block 1905). In some embodiments, the software may be loaded into one or more shared memories within the multiprocessor system. The software may, in other embodiments, be partitioned an individual parts of the software may be loaded into local memories within the multiprocessor system. Each such local memory may be coupled to a corresponding processor within the multiprocessor system.

Once the configuration data and software have been loaded into the multiprocessor system, the software may be executed (block 1906). During execution, each processor may execute the inserted synchronization instructions allowing different subsets of processors, or different processors, to synchronize their operations at the previously identified locations within the instructions threads. With the completion of the execution of the software, the method may conclude in block 1907.

It is noted that the some of the operations illustrated in the flowchart of FIG. 19 are depicted as being performed in a sequential fashion. In other embodiments, one or more of the may be performed in parallel.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A system, comprising:
a plurality of processors, wherein each processor of the plurality of processors includes a plurality of processor ports and a synchronization adapter, wherein the synchronization adapter includes a plurality of adapter ports;
a plurality of controllers, wherein each controller of the plurality of controllers includes a plurality of controller ports, wherein each controller port of the plurality of controller ports is coupled to adapter port of a neighboring processor of the plurality of processors;
wherein each processor of the plurality of processors is configured to:
execute a plurality of threads, wherein each thread of the plurality of threads includes a plurality of program instructions;
send, selectively, a plurality of synchronization signals through a given adapter port to a respective controller of the plurality of controllers; and
pause execution of program instructions included in a given thread of the plurality of threads dependent upon a response from the respective controller;
wherein each controller of the plurality of controllers is configured to:
receive a respective plurality of synchronization signals from each processor of one or more processors of the plurality of processors; and
send a response to each processor of the one or more processors dependent upon a corresponding plurality of synchronization signals of the received respective plurality of synchronization signals.

2. The system of claim 1, wherein a number of synchronization signals included in the plurality of synchronization signals is dependent upon a number of threads included in the plurality of threads.

3. The system of claim 2, wherein the number of synchronization signals included in the plurality of synchronization signals is further dependent upon a number of processor included in the one or more processors.

4. The system of claim 1, wherein each controller of the plurality of controllers includes a configuration port configured to receive one or more configuration data bits.

5. The system of claim 4, wherein to send the response to each of the respective one or more processors, each controller of the plurality of controllers is further configured to send the response to the respective one or more processors dependent upon the one or more configuration data bits.

6. A method for operating a multiprocessor system, wherein the multiprocessor system includes a plurality of processors and a plurality of synchronization controllers, wherein each processor of the plurality of processors includes a synchronization adapter, the method comprising:
designing configuration data and software for each group of one or more groups of processors, wherein each group of the one or more groups of processors includes a subset of the plurality of processors, and wherein designing the configuration data and the software includes:
identifying a given group of the one or more groups of processors and at least one location in the software of each processor of the given group for inserting a synchronization barrier;
identifying a synchronization controller of the plurality of synchronization controllers that is coupled with each synchronization adapter of each processor of the given group;
determining configuration data for the identified synchronization controller dependent upon a direction to each synchronization adapter coupled to the identified synchronization controller, wherein the configuration data enables the transmission of a plurality of synchronization signals between the identified synchronization controller and the synchronization adapter of selected processors of the given group; and
inserting a synchronization barrier into each one of the identified locations in the software for each processor of the given group, wherein each synchronization barrier includes a sequence of one or more synchronization instructions, wherein each synchronization instruction includes one or more arguments, and wherein each argument of the one or more arguments specifies a given one of one or more directions of the identified synchronization controller from the synchronization adapter of each processor of the given group;
loading the designed configuration data and software into the multiprocessor system;
executing the loaded software;
pausing execution of a given thread in each one of a respective plurality of threads being executed by a corresponding processor of the given group in response to each processor of the given group executing a given one of the inserted synchronization instructions; and
resuming execution the given thread in each one of the respective plurality of threads in response to a determination that all processors of the given group have executed a respective one of the inserted synchronization instructions.

7. The method of claim 6, wherein the determined configuration data includes a plurality of configuration data bits, each data pattern corresponding to each combination of the plurality of configuration data bits corresponds to a direction to the synchronization adapter of a given processor of the given group of processors coupled to the identified synchronization controller.

8. The method of claim 7, wherein loading configuration data into the multiprocessor system comprises storing the plurality of configuration data bits into a register of the identified synchronization controller.

9. The method of claim 6, wherein resuming execution of the given thread in each one of the respective plurality of threads comprises de-asserting a stall signal by the identified synchronization controller.

10. The method of claim 6, wherein pausing execution of the given thread in each one of the respective plurality of threads comprises asserting synchronization request signal by the synchronization adapter of each processor of the given group.

11. A synchronization controller, comprising:
a register configured to store a plurality of configuration bits, wherein the plurality of configuration bits encode a plurality of data patterns, wherein each data pattern of the plurality of data patterns corresponds to a given one of a plurality of subsets of coupled directions;
one or more logic circuits, wherein each logic circuit of the one or more logic circuits is configured to:
receive a first plurality of synchronization request signals, wherein each synchronization request signal of the first plurality of synchronization request signals corresponds to a respective thread of a first plurality of threads executing on a first processor of a plurality of processors;
receive a second plurality of synchronization request signals, wherein each synchronization request signal of the second plurality of synchronization request signals corresponds to a respective thread of a second plurality of threads executing on a second processor of the plurality of processors;
generate a stall signal for at least one processor of the plurality of processors dependent upon the first plurality of synchronization request signals and the second plurality of synchronization request signals and a corresponding data pattern of the plurality of data patterns, wherein the at least one processor is coupled to synchronization controller in a given direction of a corresponding one of the plurality of subsets of coupled directions.

12. The synchronization controller of claim 11, wherein each entry of the one or more entries includes a latch.

13. The synchronization controller of claim 11, wherein to generate the stall signal dependent upon the first plurality of synchronization request signals and the second plurality of synchronization request signals and the corresponding data pattern of the plurality of data patterns, each logic circuit is further configured to generate one or more stall signals corresponding to the directions of the corresponding one of the plurality of subsets of coupled directions.

14. The synchronization controller of claim 11, wherein to generate the stall signal dependent upon the first plurality of synchronization request signals and the second plurality of synchronization request signals and the corresponding data pattern of the plurality of data patterns, each logic circuit is further configured to generate the stall signal responsive to the assertion of a selected one of the first plurality of synchronization request signals, wherein the selected one of the first plurality of synchronization request signals corresponds to the direction of the corresponding data pattern of the plurality of data patterns.

15. The synchronization controller of claim 14, wherein to generate the stall signal dependent upon the first plurality of synchronization request signals and the second plurality of synchronization request signals and the corresponding data pattern of the plurality of data patterns, each logic circuit is further configured to generate the stall signal responsive to a determination that the remaining synchronization signals included in the first plurality of synchronization request signals are not asserted.

16. A system, comprising:
a plurality of processors, wherein each processor of the plurality of processors includes a synchronization adapter, wherein the synchronization adapter includes a plurality of adapter ports;
wherein each processor of the plurality of processors is configured to execute a plurality of threads;
a plurality of data memory routers coupled to the plurality of processors in an interspersed arrangement, wherein each data memory router of the plurality of data memory routers includes:
a local memory coupled to a subset of the plurality of processors;
at least one routing engine; and
a synchronization controller coupled to at least one of the plurality of adapter ports of each processor of the subset of the plurality processors;
wherein each synchronization adapter is configured to:
selectively send a plurality of synchronization signals through a given one of the plurality of adapter ports to at least one synchronization controller, wherein each synchronization signal of the plurality of synchronization signal corresponds to a respective thread of the plurality of threads;
pause processor execution of program instructions included in a given thread in response to sending a corresponding synchronization signal of the plurality of synchronization signals;
resume execution of the program instructions included in the given thread dependent on a response to the corresponding synchronization signal from the at least one synchronization controller;
wherein each synchronization controller is configured to:
receive a respective plurality of synchronization signals from a each synchronization adapters of one or more synchronization adapters; and
send a response to each synchronization adapter of the one or more synchronization adapters dependent upon the received respective plurality of synchronization signals.

17. The system of claim 16, wherein each synchronization controller includes a configuration port configured to receive one or more configuration data bits.

18. The system of claim 17, wherein to send the response to each synchronization adapter of the one or more synchronization adapters, each synchronization controller is further configured to send the response to each synchronization adapter of the one or more synchronization adapters dependent upon the one or more configuration data bits.

19. The system of claim 17, wherein each synchronization controller is further configured to store the received one or more configuration bits in a register.

20. The system of claim 17, wherein each one of the one or more configuration bits corresponds to a given one of one or more directions, wherein each direction of the one or more directions corresponds to a respective synchronization adapter of the one or more synchronization adapters.

* * * * *